United States Patent [19]

Young, Jr.

[11] 4,133,130
[45] Jan. 9, 1979

[54] SIGNALLING MEANS FOR A FISHING ROD

[76] Inventor: Russell L. Young, Jr., 424 Washington St., Boonton, N.J. 07005

[21] Appl. No.: 840,056

[22] Filed: Oct. 6, 1977

[51] Int. Cl.² .............................................. A01K 97/12
[52] U.S. Cl. ....................................................... 43/17
[58] Field of Search ........................................ 43/17

[56] References Cited

U.S. PATENT DOCUMENTS

| 3,878,635 | 4/1975 | Trosper et al. | 43/17 |
| 3,959,910 | 6/1976 | Montgomery | 43/17 |

*Primary Examiner*—Robert C. Watson
*Attorney, Agent, or Firm*—Thomas N. Neiman

[57] ABSTRACT

In an embodiment shown, the invention comprises a dual-chambered housing which has a spring clip integral therewith for replaceably clasping the housing atop a fishing rod. One of the chambers replaceably receives a battery and a light bulb, the two substantially comprising a classic flashlight assembly, in which the bulb has its base in contacting engagement with a center-end terminal of the battery and its filament globe exposed externally of the one chamber. The threaded bonnet or shank of the bulb is received in a metal disc to which is connected a first electrical lead. The first lead is passed therefrom and into the other of the two chambers. The other chamber also receives one end of a second electrical lead which also passes therefrom into the one chamber for contacting engagement with the other-polarity end of the battery. within the other chamber, the ends of the leads are spaced apart to define an interruption in the "flashlight assembly" circuit. Also within the other chamber is a pivotally journalled element which carries an electrical contactor for engaging and bridging across the interruption to close the circuit, and a biasing and detenting assembly for biasing the element in a first open-circuit position, and for detenting the element in a second closed-circuit position. A slender limb projects from the pivotal element and from the housing to receive thereon an intermediate portion of fishing line so that, as the line is made taut — upon game fish testing bait fixed to the end of the line — the limb will cause the element to rotate from the first position thereof to the second position to cause the light bulb to flash or light and remain lit. Upon the line being made more taut — upon the game fish taking the bait — the line forces the limb fully into the second position where the journalled element is detented and held, and the light bulb stays lit.

11 Claims, 9 Drawing Figures

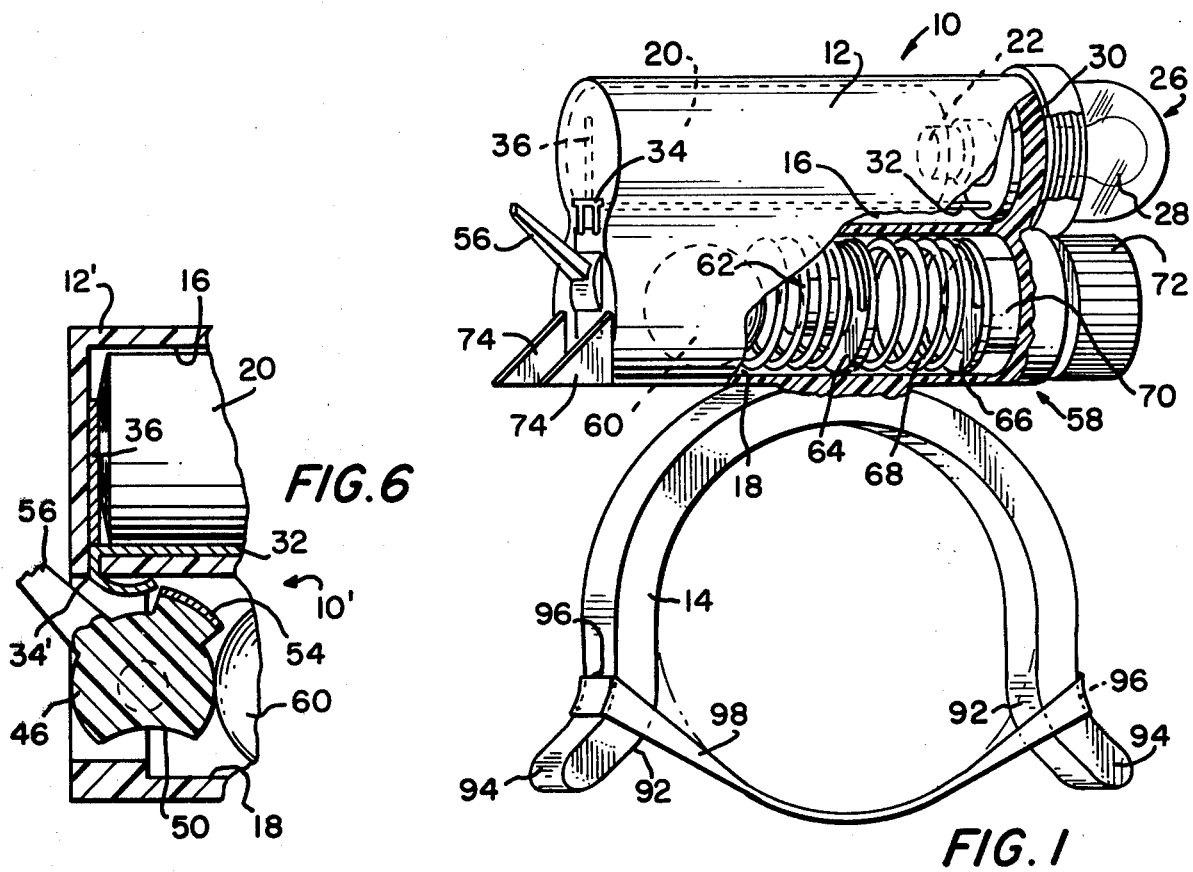
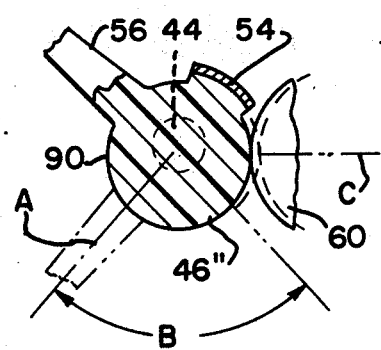
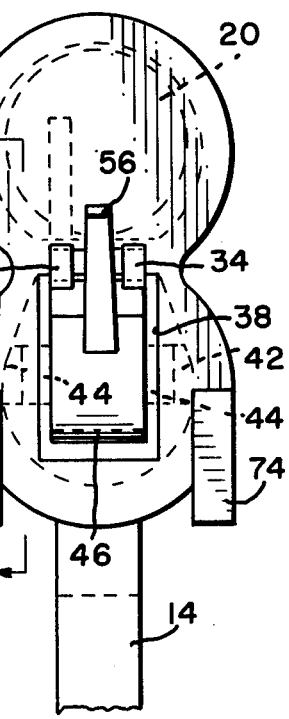
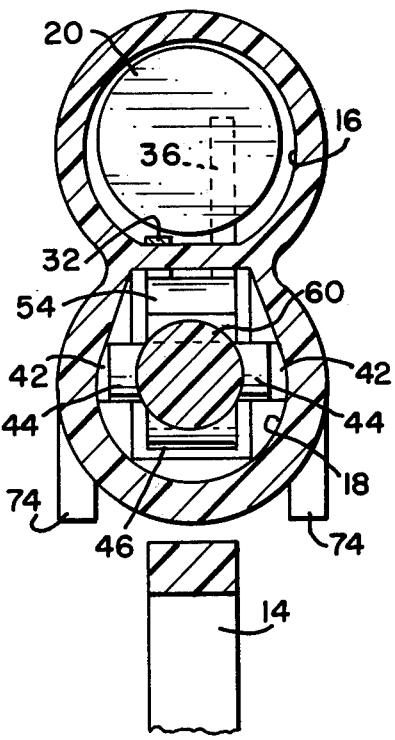

SIGNALLING MEANS FOR A FISHING ROD

This invention pertains to fishing equipment, and in particular to means for use with a fishing rod for signalling the nibbling and taking of bait (or lure) by fish, the signalling means being replaceably clasped to the rod.

It is an object of this invention to set forth an improved signalling means for a fishing rod. Particularly it is an object of this invention to disclose signalling means for a fishing rod comprising a housing; said housing having means extending therefrom for clasping said housing to a fishing rod; and a signalling assembly carried by said housing; said signalling assembly including means defining an electrical circuit having, in series connection, a signal emitter, switching means for opening and closing said circuit, and contact means for contacting terminals of an electrical storage battery; wherein said contact means comprise electrical leads disposed in spaced apart relationship, to define a circuit interruption therebetween; said switching means comprise an element pivotally coupled to, and projecting from, said housing, for movement from a first position relative to said housing to a second position relative to said housing; said element having means for engaging and bridging across said interruption to effect electrical continuity between said leads, upon said element moving from said first position to said second position, to close and circuit; and further including means carried by said housing for biasing said element in said first position, and for detenting said element in said second position.

Further objects of this invention, as well as the novel features thereof, will become more apparent by reference to the following description taken in conjunction with the accompanying figures, in which:

FIG. 1 is an isometric projection of a first embodiment of the invention, with a portion of the housing shown broken away to disclose some of the internally-confined components;

FIG. 2 is an end view of the embodiment of FIG. 1, in approximately twice the scale of FIG. 1, taken from the left-hand side of FIG. 1;

FIG. 4 is a cross-sectional view taken along section 4—4 of FIG. 3;

FIG. 6 is a cross-sectional view similar to that of FIG. 3 which, however, depicts an alternative embodiment of the invention;

FIG. 9 is a fragmentary view, of still a further embodiment of the invention, similar to FIG. 6.

Figure 3:
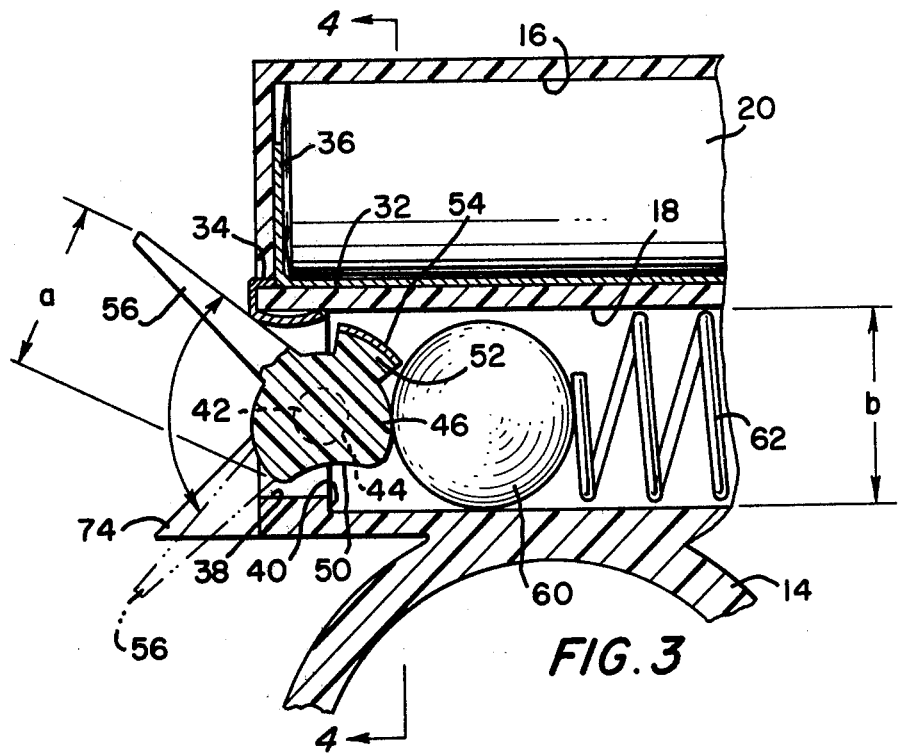
FIG. 3 is a cross-sectional view taken along section 3—3 of FIG. 2.

As shown in FIGS. 1 through 5, a first embodiment of the novel signalling means 10 comprises a housing 12 which has a fishing rod-engaging clip 14 integrally formed therewith. The housing 12 has a pair of chambers 16 and 18 formed therein in which to receive the operative components. Chamber 16 and its components substantially comprise a classic "flashlight assembly", having therewithin an electrical storage battery 20 with a center-terminal 22 which engages the central terminal or button 24 of a light bulb subassembly 26. The subassembly 26 comprises a light bulb 28 which is received in a disc 30 which electrically contacts the bonnet or shank of the bulb. An electrical lead 32 is fixed to the disc 30 and passes along the lower portion of the chamber 16 to exit through a slot 34 provided therefor in the other end of the chamber. A second electrical lead 36 is also passed through the slot 34 and set against the inner end surface of chamber 16, there to make contacting engagement with the base/pole end of the battery 20. The other terminal ends of the leads 32 and 36 are turned into chamber 18, via an aperture 38 formed in an end of the chamber 18, to assume a spaced apart disposition therewithin.

In that the ends of leads 32 and 36 are spaced apart, in chamber 18, they define an interruption in the circuitry which, otherwise, would cause the light bulb to light. Hence, chamber 18 confines therewithin those components which are operative to cause the light bulb 28 to illuminate. Aperture 38 opens onto the inner wall 40 of chamber 18, and wall 40 has — to each side of aperture 38 — arcuate recesses 42 formed therein. Recesses 42 replaceably receive a pair of journals 44 which are formed at opposite sides of a rotary element 46. Element 46 has an arcuate peripheral surface 48 the radial center of which is offset from the rotary or axial center of journals 44. Too, element surface 48 has three discontinuities. A first thereof defines a concave recess 50, another comprises an extended segmental land 52 which has a surmounting electrical contactor 54 fixed thereto, and the third comprises a projecting, slender limb 56.

As will be recognized, when element 46 rotates (in a counter-clockwise direction, as viewed in FIG. 3), it brings the contactor 54 into bridging and contacting engagement with the ends of leads 32 and 36 which are set within chamber 18. Thus, the electrical circuitry is completed or closed, and the light bulb 28 lights. Now, limb 56 is provided to receive thereupon an intermediate portion of fishing line which has been drawn up from the underlying fishing rod. Accordingly, as the line becomes taut, it moves the limb 56 downwardly to cause just such a closure of the electrical circuitry.

Engaging surface 48 of element 46, and confined in chamber 18, is a biasing and detenting assembly 58. Assembly 58 comprises a ball 60, a first compression spring 62, a spring guide 64, a second compression spring 66, and a spring-engaging disc 68. Disc 68 is carried on a rod 70 which extends into chamber 18 from an end cap 72. Cap 72 is knurled, to facilitate its manual adjustment, and is threadedly engaged with a bore formed in the end of chamber 18. Simply by turning cap 72 into and out of chamber 18, then, the biasing restraint of springs 62 and 66 can be altered. Spring 62 engages the bass 60 which, in turn, biases element 46.

Due to the eccentricity of surface 48 of element 46, relative to the journals 44, it requires more and more force on limb 56 to cause the element 46 to rotate counter-clockwise — until recess 50 comes into position before the ball 60. Then the ball seats in the recess 50 to detent the element 46 in its circuit-closure position (shown in phantom in FIG. 3) with the limb 56 turned downwardly. With only a few degrees of rotation of element 46, of course, contactor 54 engages leads 32 and 36 so that, if fish are "nibbling" on the bait fixed to the line, the light bult 28 will flash. When a fish takes the bait (or lure), the limb swings fully downward to allow to ball to seat in the recess 50 — to cause the light bulb 28 to stay illuminated.

To assist the line in "clearing" the signalling means 10, and to help it in sliding outwardly relative to the fishing rod, the housing 12 has a pair of triangular deflectors 74 integral therewith and extending outwardly therefrom to each side of the aperture 38. The line would have a tendency to remain engaged with the limb 56, whereat thereon it is seated with the limb in the uppermost positioning thereof. Hence, the line would move through an arc such as that shown by the arcuate arrow-heads in FIG. 3. The deflectors 74, however, receive the line from the limb 56 and cause it to slip and move outwardly.

It is to be noted that, with limb 56 and contactor 54, and including the greatest diameter of surface 48, element 46 has a greatest transverse dimension of "a" (FIG. 3) which is less than the diameter "b" of chamber 18. Therefore, by simply unthreading and removing cap 72 from chamber 18, all the actuating components fitted into chamber 18 can be removed from the cap end. While not shown, cap 72 is received in a threaded boss (formed in the end of chamber 18) which has a same diameter "b". Thus, chamber 18 may be *charged* with its constituent components, like chamber 16, from the same, one end of the housing 12.

Signalling means 10 has the leads 32 and 36 make a turn from chamber 18 into chamber 16, via the slot 34, by running across an intervening edge of the housing 12. Thus, the traversing portions of the leads are externally exposed. This is a quite acceptable arrangement, as the cited portions are not likely to become snared and displaced. Yet, in an alternative embodiment of the signalling means 10' shown in FIG. 6, the traversing portions of the leads 32 and 36 are confined within the housing 12'. This arrangement is accommodated by the formation of a slot 34' which directly communicates the two chambers 18 and 16, and passing the two leads therethrough.

Figure 7:
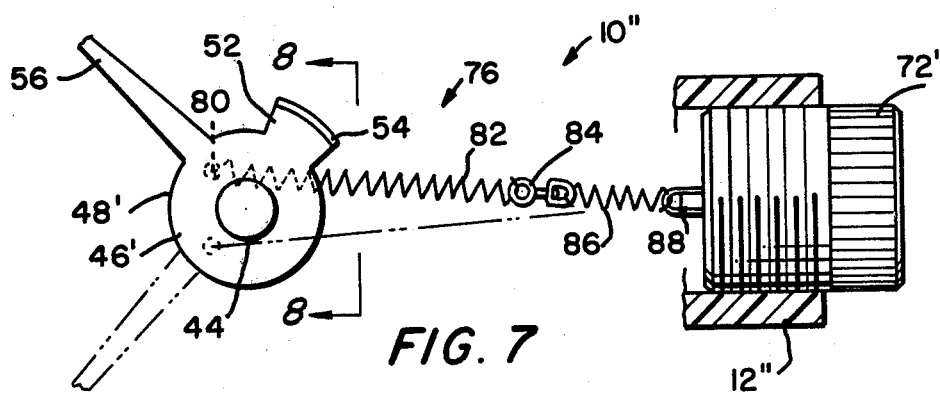
FIG. 7 is a side view of yet another embodiment of the invention which employs an over-the-center spring biasing means.
Figure 5:
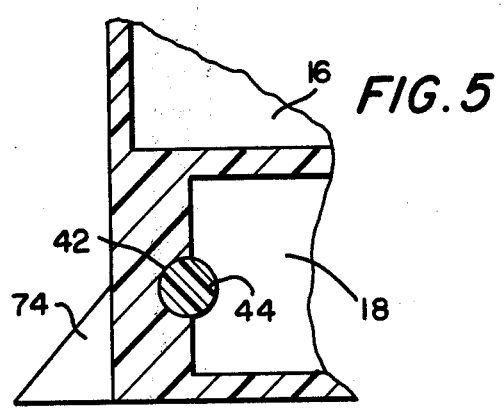
FIG. 5 is a cross-sectional view taken along section 5—5 of FIG. 2.
Figure 8:
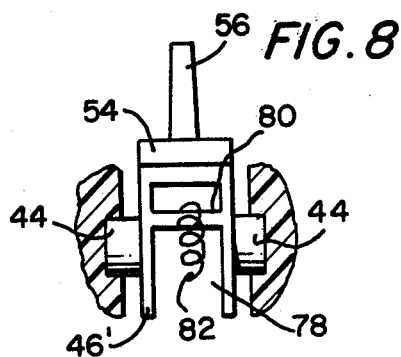
FIG. 8 is a cross-sectional view taken along section 8—8 of FIG. 7.

FIGS. 7 and 8 depict yet another embodiment of the signalling means 10", in which only the alternative biasing and detenting arrangement 76 is shown. Arrangement 76 comprises the use of an over-the-center spring biasing. The element 46' has an open channel 78 formed therein with a pin 80 fixed thereacross. One end of a first extension spring 82 is fixed to the pin and the other end to a swivel coupling 84. A second extension spring 86 is fixed between the coupling 84 and a boss 88 projecting from the cap 72'. Now then, as the springs 82 and 86 will carry the element 46' into a "detented" position, with the limb 56 deflected downward, there is no need for the element 46' to have a ball-receiving recess. Too, as shown, the arcuate peripheral surface 48' of element 46' is coaxial with the journals 44.

The further embodiment of the invention which is shown in FIG. 9 comprises a rotary element 46" which has no concave recess (like that of recess 50, FIG. 6). Rather the full surface 90 of element 46" which engages the ball 60 is convex. Yet, like element 46 (FIG. 6), element 46" has its journals 44 offset from the radial center of surface 90. Too, relative to the rotary center of journals 44, the greatest radial distance of surface 90 is located at point "A" — with element 46" in the relaxed or quiescent disposition thereof shown in full line illustration. Accordingly, when the element 46" is slued through the arc "B" shown (in response to game fish action), point "A" is yet below the median bearing point or plane "C" of ball 60. As a consequence of this, element 46" is forced to return to its quiescent positioning, after the fishing line has slid off the limb 56 and deflectors 74. Thus, light bulb 28 will be illuminated while the limb 56 slues downward and returns, but will be extinguished thereafter.

To revert to FIG. 1, it can be seen that the clip 14 which engages the fishing rod (represented by the dashed-line circle) has smoothly curved fingers 92 to accommodate a gentle, non-abrasive emplacement of the clip 14 on the rod — as well as a smooth, sliding removal therefrom. Also, the fingers 92 are flared outwardly, terminating in ends 94. These ends 94 facilitate a spreading of the fingers 92, to ease removal and installation of the signalling means relative to the rod, and further they define lateral coves 96. With the tensioned clasp of a rubber band 98 across the bottom of the rod, between the coves 96, the signalling means is held against displacement from the rod when, as for instance, the user casts line. Patently, a plastic or metal band or the like could be used in place of the rubber band 98.

While I have described my invention in connection with specific embodiments thereof, it is to be clearly understood that this is done only by way of example and not as a limitation to the scope of my invention as set forth in the objects thereof and in the appended claims.

I claim:
1. Signalling means for a fishing rod, comprising:
a housing;
said housing having means extending therefrom for clasping said housing to a fishing rod; and
a signalling assembly carried by said housing;
said signalling assembly including means defining an electrical circuit having, in series connection, a signal emitter, switching means for opening and closing said circuit, and contact means for contacting terminals of an electrical storage battery; wherein
said contact means comprise electrical leads disposed in spaced apart relationship, to define a circuit interruption therebetween;
said switching means comprises an element pivotally coupled to, and projecting from, and housing, for movement from a first position relative to said housing to a second position relative to said housing;
said element having means for engaging and bridging across said interruption to effect electrical continuity between said leads, upon said element moving from said first position to said second position, to close said circuit; and further including
means carried by said housing biasing said element in said first position, and for detenting said element in said second position.

2. Signalling means, according to claim 1, wherein:
said biasing means includes means for selectively adjusting the biasing of said element.

3. Signalling means, according to claim 1, wherein:
said element includes a limb which projects from said housing in a first diagonal attitude, relative to said housing, in said first position of said element, to receive thereon an intermediate portion of fishing line, and which limb projects from said housing in a second diagonal attitude in said second position of said element, to release fishing line therefrom; and further including
ramp means, projecting from said housing, cooperative with said limb for moving released fishing line outwardly of said housing.

4. Signalling means, according to claim 1, wherein:

said housing comprises a pair of chambers disposed in parallel one chamber of said pair thereof comprises means for replaceably receiving an electrical storage battery therewithin; and the other chamber of said pair thereof confines said contact means, switching means, and said biasing and detenting means therewithin.

5. Signalling means, according to claim 4, wherein:

each of said chambers open onto one end of said housing;

said one chamber, at said one end of said housing, having said signal emitter replaceably carried thereat;

said other chamber having a cap, in closure of said one housing end thereof, threadedly engaged therewith;

said other chamber further having an aperture formed therein, at the end thereof which is opposite said one end of said housing, through which said element projects.

6. Signalling means, according to 5, wherein:

said element comprises an arcuate member having a radial center, a limb projecting therefrom, and journals extending therefrom normal to said limb and offset from said radial center;

said opposite end of said other chamber has an inner surface in which are formed a pair of arcuate recesses;

said journals are rotatively and replaceably received in said recesses;

said arcuate member comprises a camming surface; and said biasing and detenting means includes means resiliently engaged with said camming surface.

7. Signalling means, according to claim 6, wherein:

said aperture opens onto said inner surface;

said limb projects outwardly through said aperture; and said element and said biasing and detenting means are slidably replaceable from said other chamber from said opposite end thereof.

8. Signalling means, according to claim 6, wherein:

said arcuate member further comprises a recessed surface; and said biasing detenting means comprises means disposed for detentably engaging said recessed surface.

9. Signalling means, according to claim 5, wherein:

said one chamber has a slot formed therein, at the end thereof which is opposite said one end of said housing;

said electrical leads pass from said one chamber, through said slot, and into said other chamber; and said interruption engaging and bridging means comprises an electrical contactor which closes upon and contacts said leads, said electrical contactor being disposed on an outer surface of said element.

10. Signalling means, according to claim 5, wherein:

said element comprises an arcuate member having an axial center, a limb projecting therefrom normal to said axial center, and journals extending therefrom coaxial with said center;

said opposite end of said other chamber has an inner surface in which are formed a pair of arcuate recesses;

said journals are rotatively and replaceably received in said recesses; and said biasing and detenting means comprises over-the-center spring means, said spring means being fixed at one end thereof to said arcuate member offset from said axial center thereof, and at the other end thereof to said cap.

11. Signalling means for a fishing rod, comprising:

a housing;

said housing having means extending therefrom for clasping said housing to a fishing rod; and a signalling assembly carried by said housing;

said signalling assembly including means defining an electrical circuit having, in series connection, a signal emitter, switching means for opening and closing said circuit, and contact means for contacting terminals of an electrical storage battery; wherein said contact means comprise electrical leads disposed in spaced apart relationship, to define a circuit interruption therebetween;

said switching means comprises an element pivotally coupled to, and projecting from, said housing, for movement from a first position relative to said housing, to a second position relative to said housing;

said element having means for engaging and bridging across said interruption to effect electrical continuity between said leads, upon said element moving from said first position to said second position, to close said circuit; and further including means carried by said housing for (a) biasing said element in said first position, (b) restraining said element against movement to said second position, and (c) forcing said element into said first position upon movement thereof into said second position.

* * * * *